Jan. 4, 1966   J. H. LEMELSON   3,226,833
AUTOMATIC INSPECTION APPARATUS AND METHOD
Filed Jan. 11, 1963   5 Sheets-Sheet 1

INVENTOR.
Jerome H. Lemelson

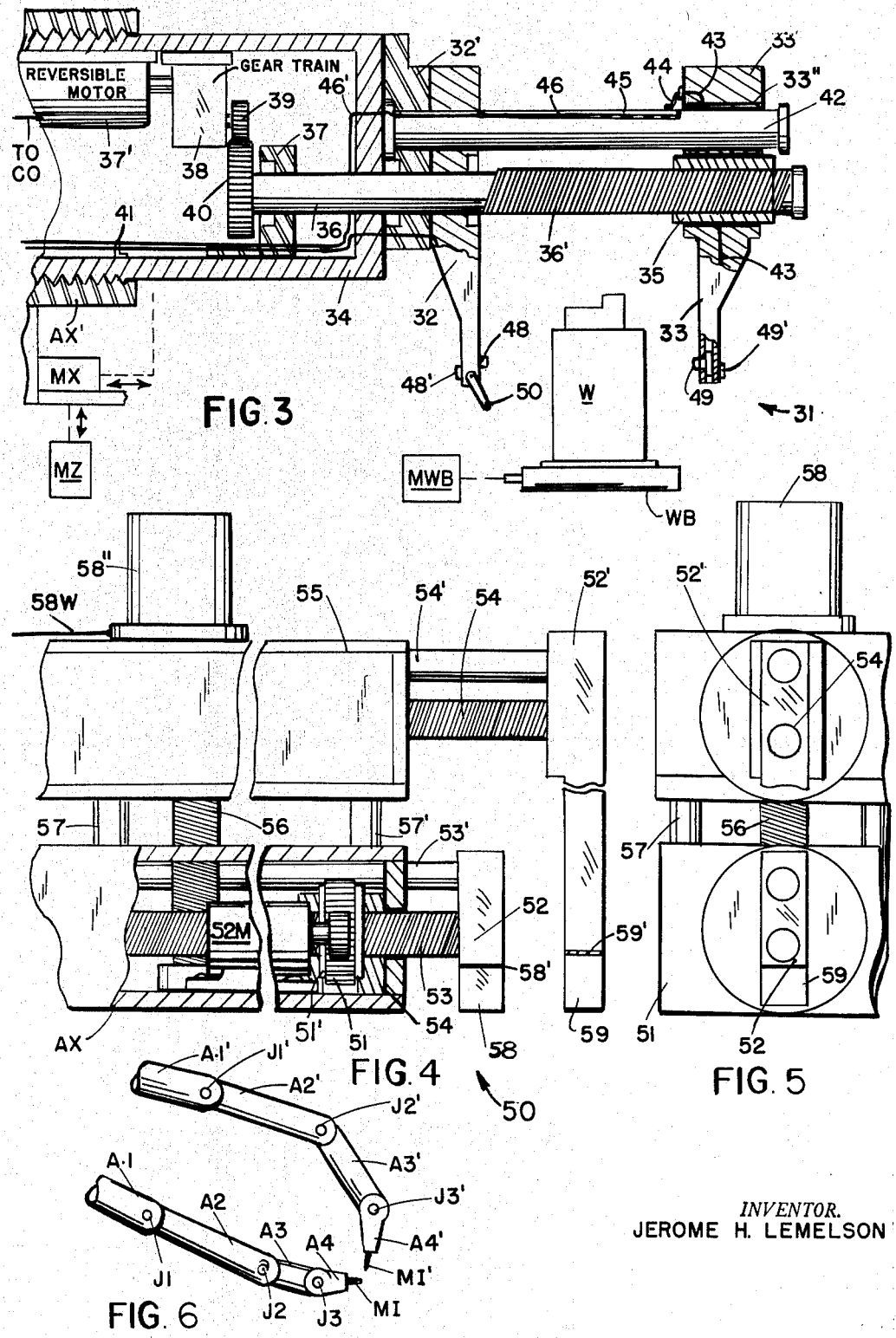

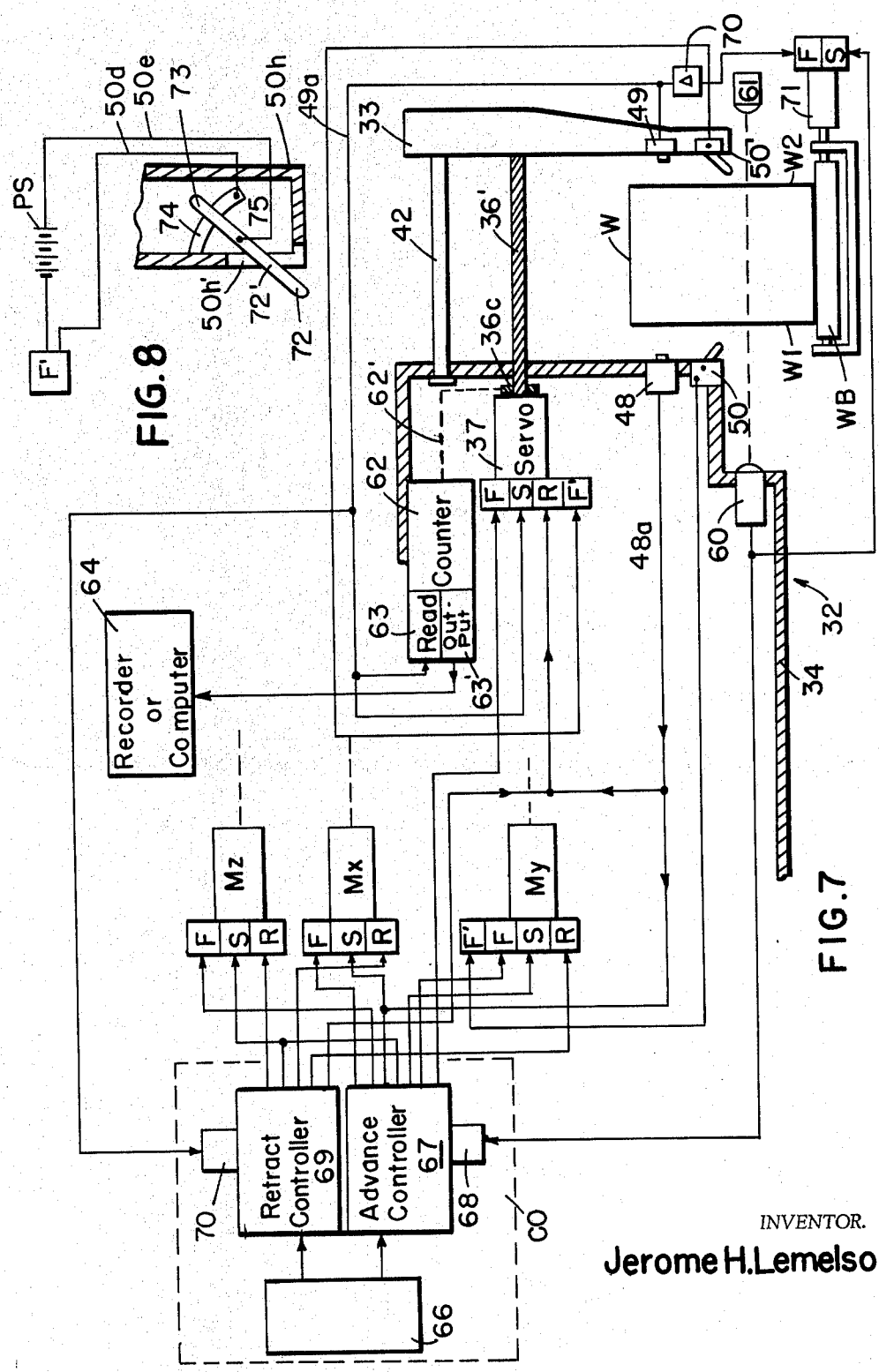

Jan. 4, 1966 J. H. LEMELSON 3,226,833
AUTOMATIC INSPECTION APPARATUS AND METHOD
Filed Jan. 11, 1963 5 Sheets-Sheet 5
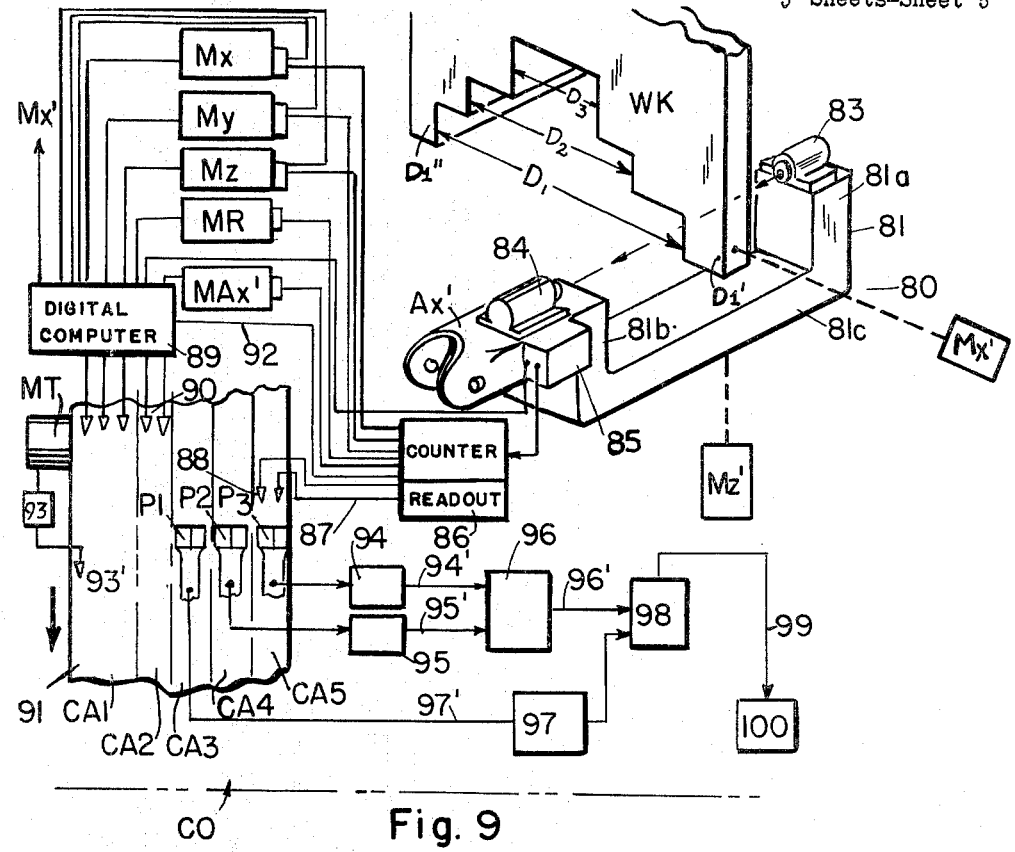
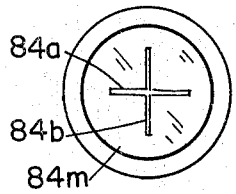
Fig. 10
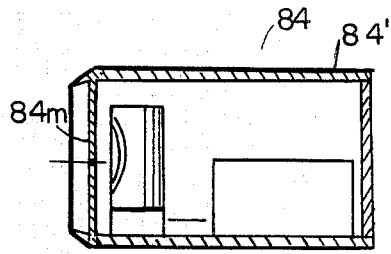
Fig. 11
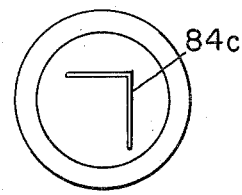
Fig. 12
INVENTOR.
Jerome H. Lemelson United States Patent Office 3,226,833
Patented Jan. 4, 1966

3,226,833
AUTOMATIC INSPECTION APPARATUS
AND METHOD
Jerome H. Lemelson, 85 Rector St., Metuchen, N.J.
Filed Jan. 11, 1963, Ser. No. 250,942
20 Claims. (Cl. 33—143)

This invention relates to automatic inspection apparatus and is a continuation-in-part application of my copending patent applications entitled Automatic Devices, Serial Number 477,467, filed on December 24, 1954, now abandoned and Serial Number 626,211 for Automatic Measurement Apparatus, filed December 4, 1956, now U.S. Patent 3,081,379.

In the performance of various measurement functions, manually adjustable devices such as micrometers are frequently employed to measure length and dimensions such as inside and outside diameters. However, these devices suffer numerous shortcomings including the requirement that they be manually operated and adjusted to the length requiring measurement. Their operation requires a considerable amount of time and a precise measurement can only be effected by a skilled operator.

It is accordingly a primary object of this invention to provide a new and improved automatic measuring apparatus.

Another object is to provide an automatic measuring device or micrometer which will measure length without the need for the manual adjustment of the measuring components thereof to be positioned relative to the work or to be conformed thereto.

Another object is to provide an automatic measuring apparatus which will perform the functions of a micrometer and will measure a dimension at relatively high speed.

Another object is to provide an improved electromechanical apparatus for measuring the dimensions of a product which may be automatically controlled.

Another object is to provide an automatic measuring apparatus for measuring a plurality of dimensions of a product which may be sequentially controlled by a simple computing mechanism or by means of a command recording to effect the measurement of predetermined portions of the product.

Another object is to provide an improved automatic measuring device with a means for sensing the position of a surface.

Another object is to provide an improved measuring apparatus controlled by signals generated from a variable programming means such as a magnetic or punched tape.

Another object is to provide a new and improved measuring system employing a recording medium for both programming the movement of a measuring head relative to a workpiece and recording indications of measured dimensions.

Another object is to provide an improved measuring system employing a recording means having signals recorded thereon for both controlling the position of one or more measuring heads and further signals recorded thereon which are indicative of desired or standard dimensions, said system including means for synchronizing the reproduction of said signals and comparing the dimension indicating signals with signals derived from the measuring of dimensions of a workpiece to determine variations from a standard.

Another object is to provide an improved photoelectric scanning system for dimensional measurement.

Another object is to provide improved methods for automatically effecting dimensional measurement.

For a better understanding of the invention together with other and further objects thereof, reference is made to the following description taken in conjunction with the accompanying drawings and its scope will be pointed out in the appended claims. In the drawings:

FIG. 3 is a side view with parts broken away for clarity of work measuring jaws suitable for use in the apparatus of FIG. 1;

FIG. 4 is a side view with parts broken away for clarity of surface sensing jaw elements having grounding or non-contacting surface sensing means;

FIG. 5 is an end view of the apparatus of FIG. 4 with parts broken away for clarity;

FIG. 6 is a side view showing an arrangement of manipulator elements including surface sensing probes suitable for use in the apparatus of FIG. 2;

FIG. 7 is a schematic diagram showing means for controlling the apparatus illustrated in FIGS. 1 and 3 suitable for use in also the other automatic measuring apparatus of this invention;

FIG. 8 is a partial view with parts broken away for clarity of a portion of the apparatus of FIGS. 3 and 7;

Figure 9:
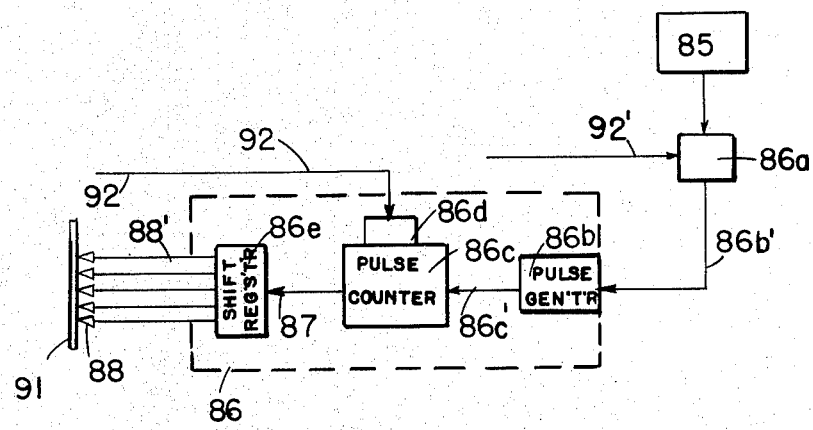
FIG. 9 is a schematic diagram showing control elements operative for effecting the automatic measurement of dimensions by optical scanning and also suitable for use in the apparatus of the other figures.
Figure 9A:
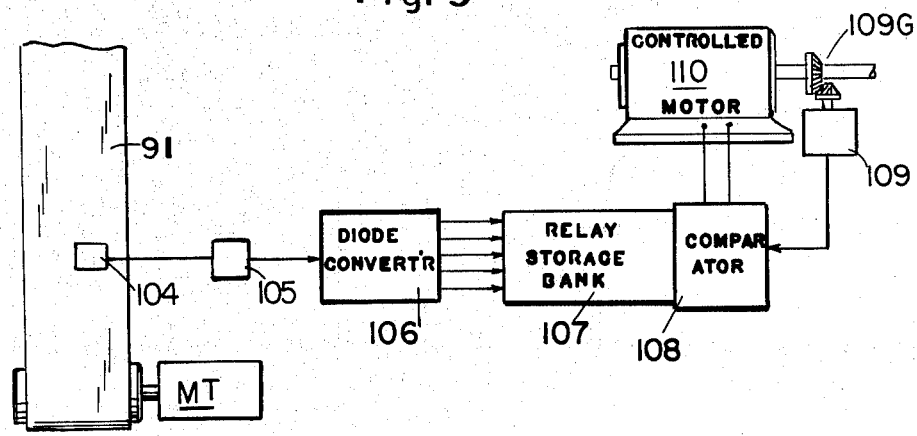

FIG. 9' is a schematic diagram showing further details of one of the control subsystems of the apparatus of FIG. 9;

FIG. 9a is a schematic diagram showing further details of the control apparatus of FIG. 9 as applied to controlling a measuring head positioning motor of the automatic measurement apparatus of this invention;

FIG. 10 is an end view of a photoelectric housing suitable for use in the apparatus of FIG. 9;

FIG. 11 is a cross-sectional side view of the housing of FIG. 10, and

FIG. 12 is an end view of a modified view of the housing illustrated in FIG. 11.

Figure 1:
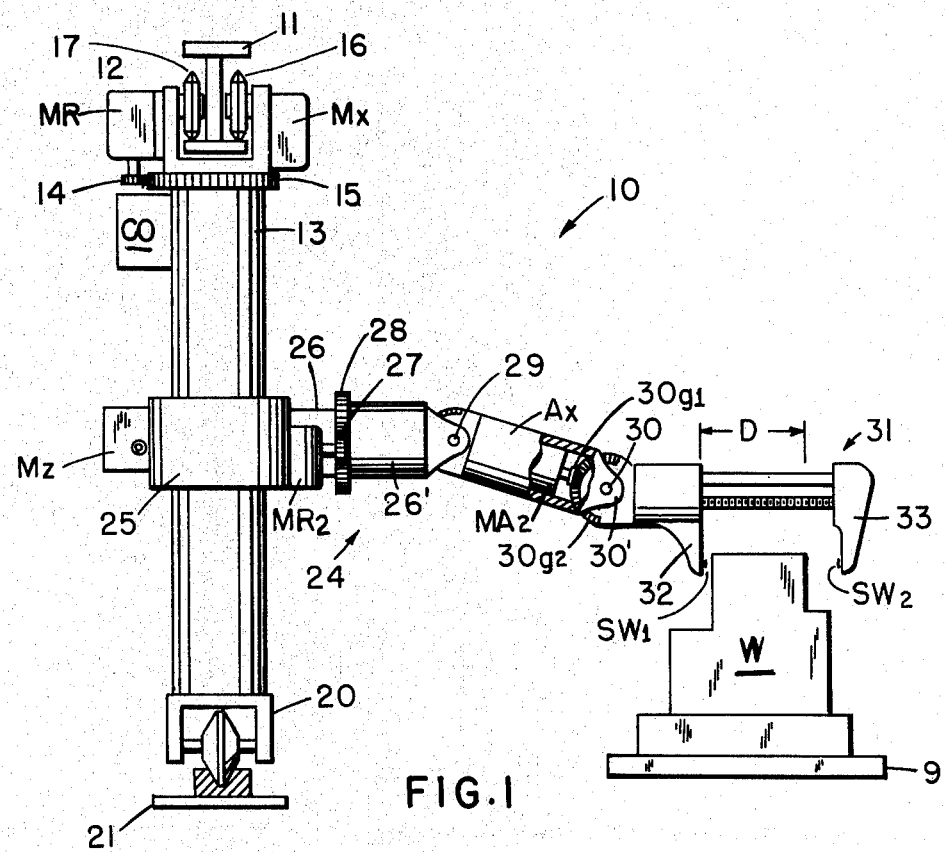
FIG. 1 is an end elevational view of an automatic dimensional measuring apparatus having movable jaws for engaging adjacent or opposite surfaces of a work piece.

In FIG. 1 an automatic measuring apparatus 10 is movable along an overhead track 11 and/or a floor mounted track 21 for prepositioning its measuring head probe assembly 31 relative to work in-process generally designated W. The work W may be prepositioned on a base 9 which may comprise a work table or a conveyor adapted also to bring the work into alignment with the measuring apparatus 10.

The measuring apparatus 10 is shown having a programming controller CO shown mounted in a housing secured to the apparatus which preferably includes easily presettable or programmable control elements operatively connected for controlling the various servo motors associated with the measuring apparatus to preposition the measuring head, for example, directly over the portion of the workpiece or assembly W to measure a dimension such as D. The programming controller CO may consist of a plurality of manually presettable dials for presetting precision resistors, counters or switching circuits for controlling the movement of the components to be described whereby the measuring head 31 is moved through a predetermined path relative to the workpiece. In addition to prepositioning the measuring head 31, the controller CO preferably further effects movement of one or more contact or proximity probes associated with measuring head 31 which are automatically halted and retracted upon sensing a surface comprising one of the plurality of surfaces across which measurement is desired. Initiation of the operation of controller CO may be manually effected once the assembly 10 is in a predetermined position relative to the workpiece W or by automatic means as will be hereinafter described.

The automatic measuring apparatus comprises, in FIG. 1, an overhead carriage 12 supporting a vertical column 13 which is shown rotatedly mounted and depending downward from 12. A first motor Mx is secured to the carriage 12 and is preferably a gear-motor having a drive wheel 16 having peripheral teeth and secured to the shaft of motor Mx and urged thereby to engage a shaped portion 11' of the overhead track for longitudinally driving assembly 10 therealong. In a similar manner, a drive motor such as Mx may be secured to the carriage or retainer 20 at the lower end of column 13 for urging said assembly along the floor mounted track 21.

A fixture 24 which includes the measuring head assembly 31 extends from a base or carriage 25 and is adapted for moving vertically along the column 13 to position the measuring head assembly in the vertical direction. A large spur gear 15 is shown secured to the upper end of column 13 which is engaged by a smaller spur gear 14 secured to the shaft of a motor MR which is secured to the upper carriage 12 and is controlled in its operation by signals from programming controller CO to rotate column 13 for prepositioning measuring head 31 in a plurality of cylindrical paths. Wheels 17 rotationally supported on the carriage 12 engage the lower portion or flange of the overhead track and further wheels supported by the lower carriage 20 also engage the lower track 21 for movement of the assembly longitudinally along the two tracks.

Projecting outward from carriage 25 is an assembly including a first cylindrical arm member 26 mounting a first gear-motor MR-2 having a shaft on which there is mounted a gear 27 which engages a larger gear 28 secured to a second arm 26' which is thereby rotatable relative to member 26 by means of said motor. The other end of arm 26' contains a rotational joint 29 which pivotly supports a third arm Ax in which there is internally mounted a third gear motor MA1, not shown, for pivoting arm Ax relative to second arm 26'. The other end of arm Ax contains a pivoting joint 30 and a fourth gear motor MA2 which is operative to rotate a portion of the joint 30 including the measuring head assembly 31 relative to arm Ax. As stated, all of the hereinabove described drive motors contain respective start, stop, reverse and speed controls which are operatively coupled to and controllable by the controlling programmer CO by means illustrated in my said copending application. The measuring head 31 is thus prepositioned relative to the workpiece W by the automatic and predetermined control of said servo motors and is preferably operative thereafter to engage one or more surfaces of said workpiece aligned with the assembly 10 and to effect automatic measurement across predetermined portions of the workpiece.

Notations SW1 and SW2 define indicating or sensing means positioned on or within movable portions 32 and 33 of the measuring head 31 for sensing surfaces of workpiece W and indicating by generating electrical signals when a particular surface is in contact with or immediately adjacent said sensing means. The sensors SW may comprise electro-mechanical limit switches adapted with actuator means operative upon engagement of a work piece surface, surface proximity detectors such as capacitance discharge or electro-magnetic relays operative when proximate to a surface, photoelectric or other radiation sensitive means, etc. Similar surface detection means may be utilized in the apparatus hereinafter described to indicate the proximity of one or more surfaces for effecting automatic measurement functions.

Rotation of the assembly 31 relative to arm Ax may be effected by gear means as illustrated in my application, Ser. No. 477,467. As shown in FIG. 1, reversible gearmotor MA2, mounted within arm Ax, has a small bevel gear 30G-1 secured to its output shaft which gear engages teeth of a larger gear 30G-2 which is fixedly assembled with assembly 31 and is supported in bearing between portion of a yoke formation 30' projecting from the end of arm Ax. Thus, as motor MA-2 operates, assembly 31 will pivot about the axis of joint 30, the direction and degree of such movement depending upon the rotation and degree of operation of MA-2.

Figure 2:
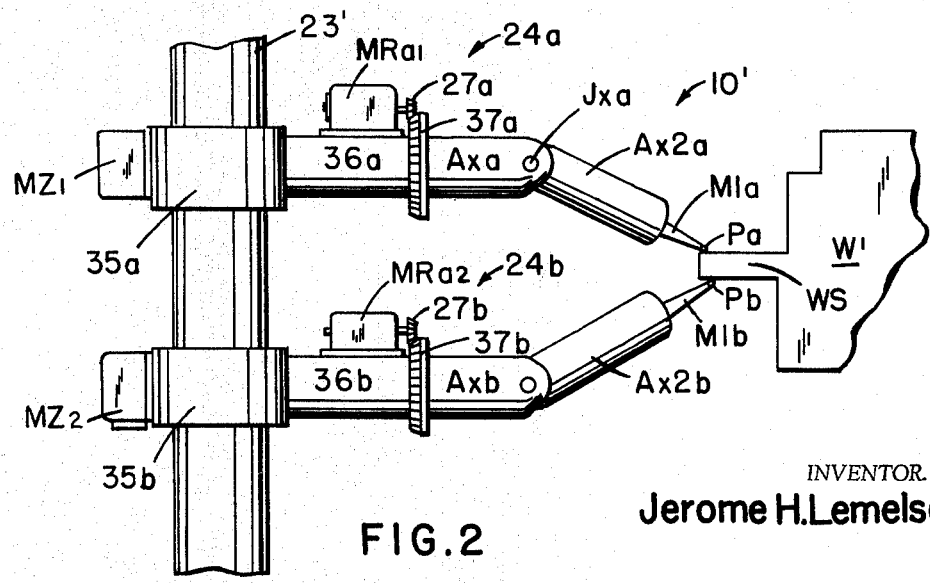
FIG. 2 is an end elevation showing an automatic measuring apparatus having a plurality of movable and programmably adjustable surface sensing probes.

FIG. 2 illustrates a portion of an automatic measuring apparatus which may also have components provided in the apparatus of FIG. 1 or may be otherwise modified as hereinafter described. The assembly 10' includes in addition to a vertical column 23' which, like the column 13 of FIG. 1, may be stationary, longitudinally movable along a track, rotatable and/or pivotable and serves as means for supporting and guiding, a plurality of measuring probe assemblies referred to by the notations 24a and 24b. The measuring probe assembly 24a is movable vertically up and down column 23' on a carriage or base 35a which also supports a motor MZ1 which is operative for vertically driving carriage 35a up and down column 23'. Similarly the assembly 24b is supported on a base 35b adapted for up and down movement along column 23' and drivable by a motor MZ2 mounted thereon. The assembly 24a will be described and, for the purpose of simplifying the description, assembly 24b is shown as having similar components to those of 24a but referred to by similar numerical notations having sub-scripts "b" rather than "a." Mounted on the lateral cylindrical column 36a is a gear motor MRa1 having a small gear 27a pinned to the end of its shaft which engages a larger bevel gear 37a secured to a second arm Axa which is rotationally supported relative to column 36a and rotatable with the operation of motor MRa1. The other end of Axa is provided with a joint Jxa which pivotally supports a further arm Ax2a for rotation about the axis of the joint. Secured to the end of arm Ax2a is a measuring probe M1a the end of which mounts a proximity sensing element Pa which is adapted to sense the presence of a surface of the workpiece when immediately adjacent thereto or in contact therewith. The sensing element Pa may comprise any known proximity sensing transducer such as an electromagnetic proximity switch, capacitance sensitive relay, photoelectric or other detector. In its simplest form, the sensing elements Pa may comprise the actuating arm of a pivoting switch or limit switch.

As hereinabove described, a single programming controller such as a programming controller (as depicted in FIG. 1, not shown in FIG. 2) CO mounted conveniently on or adjacent the column 23' and having control circuits extending therefrom and operatively connected to the various described drive servos of both assemblies 24a and 24b may be utilized for precisely prepositioning the sensing elements Pa and Pb of the probes relative to various surfaces of the workpiece W' which may be prepositioned relative to assembly 10' on a movable conveying means which may be also controlled by a programming controller such as controller CO shown in FIG. 1 or on a stationary prepositioning fixture.

Components of the assembly 24b which are the same as corresponding components of the assembly 24a have similar numerical notations with superscripts changed from "a" to "b."

While the two probe elements Pa and Pb of FIG. 2 are shown positioned for measuring the thickness of a shelf or horizontal projection Ws of the workpiece W', it is readily seen that by moving assemblies 24a and 24b along column 23', positioning by rotating, pivoting or otherwise moving column 23', controlling motors MRa and the motors pivotally positioning arms Ax2a and Ax2b, the probes M1a and M1b may be brought into contact with or adjacent many surfaces of a workpiece or assembly to effect measurement or locate said surfaces.

FIG. 3 shows details of a measuring head assembly 31 of the type illustrated in FIG. 1 which may be mounted at the end of the arm assemblies illustrated either in FIG. 1 or FIG. 2 or any suitable arrangement of movable components for prepositioning the assembly relative to a workpiece. In its simplest form, the assembly 31 of FIG. 3 may be mounted stationary above a conveyor or other type of prepositioning means for the work W which is adapted to preposition the work relative to the illustrated separated jaws after which at least one of said jaws is automatically movable to engage a surface of the workpiece.

The assembly 31 comprises a first housing 34 illusrtated as a cylindrical member which is removably secured to the end limb A$x'$ which extends from a further stationary or movable base as illustrated in FIG. 1. The measuring probes comprise a first jaw member 33 which is movable towards and away from a second jaw member 32 which is shown secured by means of a block 32' to the end of housing 34. Movement of jaw member 33 is effected by means of a long, precision cut lead screw 36' extending from and an integral part of a shaft 36 which is supported in bearing by the end wall 34' of housing 34 and bearing member 37 shown mounted within housing 34. A large spur gear 40 is secured to the end of shaft 36 and is rotated to rotate shaft 36 and the screw portion thereof by means of a smaller gear 39 secured on a shaft extending from a gear train assembly 38 which is driven by servo motor 37' secured within housing 34. A threaded bushing 35 is secured to jaw member 33 and is operative to cause jaw member 33 to move relative to jaw member 32 as shaft 36 is rotated and along the polished surface of a rod 42 which extends through a bushing 33" extending through the upper portion 33', which bushing is slidably engaged against the surface of rod 42. Shown mounted within the hollow end of jaw member 33 and having an actuator arm projecting therefrom is a limit switch 49 which is operatively connected to a control for stopping the operation of motor 37 through a plurality of wires, sliding contactors and the like including a first pair of wires 43 extending through jaw member 33 to a brush contactor 44 which rides on a strip conductor 45 inlaid in a channel in the upper surface of rod 42 and is insulated therefrom and which is connected to a further wire pair 41 which extends along the inside of housing 34 and along the arm assembly and is operatively connected to the means for controlling the operation of the drive motor 37'. A second limit switch 48 is mounted within jaw member 32 and has an actuator arm projecting outward therefrom in the direction of the jaw member 33. The switch 48 is operative to close upon movement of jaw member 32 against or in close proximity to a predetermined surface of the workpiece W and is utilized to energize the control for the motor or servo driving the assembly including housing 34 in the direction which urges jaw member 32 into close proximity or abutment with jaw member 33. The switch 48 is connected to said control through the wires included within the wire pair 41 which extend directly to switch 48 through the center of member 32. A movable arm 50 is shown pivotally mounted at the end of jaw member 32 and normally projects beyond the plane in which the end of the actuator of switch 48 normally projects. The arm 50 may be optionally applied to effect control of the motor moving the assembly including housing 34 so that it slows down when closely proximate to the surface of the work in the manner hereinafter described.

Notation MWB refers to a servo operated means operatively connected to the conveyor or prepositioning table WB which is preferably controlled by the same programming control means controlling the position of the sensing assemblies described to project WB upward and the work thereon into a position between the jaws 33 and 32. The servo arrangement may be utitlized with the apparatus illustrated in FIG. 1 or a modification thereof in which the jaws 32 and 33 are secured to a base such as housing 34 which is immovable.

Also illustrated in FIG. 3 are limit switches 48' and 49' having actuator arms protruding outwardly therefrom in opposite directions and are utilizable for measuring dimensions between surfaces which oppose each other such as inside diameters and the like.

FIGS. 4 and 5 illustrate a modified dimensional inspection head 50 having a plurality of probes, both of which are movable relative to each other and are utilized to sense the positions of opposite or aligned surfaces of a work piece without resorting to the operation of limit switches, as taught in FIG. 3, to sense or indicate the position of said surfaces for measuring the distance therebetween. The probes 52 and 52' are movable in two directions relative to each other and may be program controlled to coact with each other in measuring distances relative to the sensing means of each or, to operate separately to measure spacial positions of various surfaces of a work piece or assembly relative to a base or bench mark established by the mount or base supporting the head assembly 50.

The assembly illustrated in FIGS. 4 and 5 comprises a base A$x$ which may be rigidly affixed on a support which is immovable or adjustably positionable relative to work to be measured or may be movable on the end of a fixture such as provided in FIGS. 1 or 2 or elsewhere in this application. Movement of base or arm A$x$ may be effected by automatic control and/or by means of a relay sensing the presence of the work or assembly to be measured which may be automatically conveyed into position as illustrated in FIG. 3.

Sensing head 52 is longitudinally movable outward from the end of base A$x$ by means of a motor 52M shown mounted within A$x$ and coupled by means of gears 51 to a geared bushing 51' which is internally threaded and adapted to engage and urge longitudinal movement of a threaded rod 53 which is connected at its outer end to sensing head 52. Notation 53' refers to a shaft secured at one end to sensing head 52 and slidably supported by bushings (not shown) within housing A$x$ to serve as a longitudinal guide for the head 52. Thus operation of reversible motor 52M will effect the movement of head 52 towards and away from the end of base A$x$ and if the gear ratio is sufficiently high a complete rotation of said motor may result in a movement of the head 52 in the order of thousandths of an inch or less for precise positioning control.

A support 55 for head 52' is illustrated as being movable vertically relative to base A$x$ and supporting head 52' by means of a drive screw 54 and shaft 54' operable to move head 52' longitudinally relative to support 55 by means of a motor mounted within support 55 and gear train (not shown) similar to the described drive means for head 52. Head 55 is movable vertically relative to A$x$ by means of a drive similar to that provided within A$x$ and including a threaded shaft 56, equivalent to threaded rod 53 in operation, along which the housing or support 55 is longitudinally driven by means of a threaded bushing similar to 51' which is rotationally supported within head 55 and rotated through gears driven by motor 58". Notations 57 and 57' refer to shafts secured to base A$x$ which slidably uphold support 55 to guide same in longitudinal travel thereon. The motor, gear train and threaded bushing operatively connected to threaded shaft 54 are assumed to be mounted within 55 though not shown.

Insulatedly supported on each of the heads 52 and 52' are respective sensors 58 and 59 which may comprise pieces of metal of any suitable shape although illustrated as conforming to the shape of the portion of the heads to which they are secured. The sensors 58 and 59 are adapted to be driven into contact with the work and to complete an electrical circuit therewith or to sense the presence of the surface of the work by electro-magnetic or capacitance means. In other words, though not shown, sensors 58 and 59 are assumed to be in respective sensing circuits including relay means energizable upon positioning each sensor against or immediately adjacent a surface to be measured to generate a signal for affecting such measurement.

Notations 58' and 59' refer to strips of insulation material disposed between head sensors 58 and 59 and their respective bases 52 and 52'.

The sensors 58 and 59 may be removable for replacement to provide differently shaped surface sensing devices to conform to different work pieces. Said sensors 58 and 59 may also be adjustably positionable relative to their respective mounts if movably mounted thereon and provided with locking screw adjustment means of conventional design to conform to different measurement functions.

FIG. 6 illustrates components of a measurement assembly which is a modification of that illustrated in FIG. 2. Two surface sensing probes MI and MI' are shown respectively mounted on head A4 and A4' each of which is provided with a respective joint J3 and J3' for pivotal movement relative to second arm members A3 and A3'. The arm members A3 and A3' are further pivotally supported and rotated on joint assemblies J2 and J2' about further arm members A2 and A2' which are similarly pivotally supported on arm members A1 and A1', the latter being fixedly mounted on a common base. Each of the arm members A2 to A4 is power rotated relative to the member on which it is mounted by means of a respective motor provided within the arm member and the motors are all numerically controlled by signals generated, for example, by a programming means such as a computer operated by means of a magnetic tape. If the base on which members A1 and A1' are mounted is rotatable on a further base by means of a servo motor also controlled by signals generated and reproduced from the same tape controlling the other servos, then it is easily seen that the sensing heads MI and MI' may be positioned at substantially any two points or positions in the spatial volume attainable thereby and the positions of said heads will be a function of the number of rotations of each of the motors driving the arms A and the length of each arm.

In FIG. 7 there is illustrated a block diagram showing means for effecting positioning control of the jaw members 32 and 33 of measurement head 31 illustrated in FIGS. 1 and 3 and it is noted that the control system and components illustrated may also be applicable to the other apparatus such as illustrated in FIGS. 2, 4, 5 and 6 by appropriate modifications thereto. Motor $Mx$ is operative for driving the base on which housing 34 is supported in a longitudinal direction for positioning the jaw members 32 relative to a surface to be sensed thereby. Motor $My$ is operative for positioning the entire assembly 31 along a track such as illustrated in FIG. 1 although the use of motor $My$ may be optional, particularly if a conveyor such as designated by the legend WB is utilized for positioning the work W relative to the fixture. The motor $Mz$ is operative for moving assembly 31 in the vertical direction and again may or may not be utilized depending on the characteristics of the work being measured and how it is prepositioned relative to the measurement head. If the apparatus of FIGS. 4 and 5 is employed, motor $Mz$ may be equivalent to servo motor 58'' shown in FIG. 4 and a plurality of servos each operative to move a respective head relative to the work may replace motor $Mx$.

A positional computer CO such as shown in FIG. 1 is employed which includes a programming means 66 which may comprise a tape or card reading device having conventional means for generating a programmed sequence of signals such as digital signals which are fed to preset predetermining controllers 67 and 69. The circuitry in controller 67 is operative after being pre-set by command signals transmitted thereto from programming input device 66, and upon energization of a start-cycle input 68 to generate a plurality of control signals on plural outputs thereof which are operative to sequentially control each of the illustrated drive motors by energizing the controls of said motors either for predetermined periods of time or to effect respective predetermined degrees of rotation of each motor controlled by feedback signals generated in response to means for counting said rotations. The start-input 68 for the controller 67 is energized when a sensing device such as a photoelectric cell and relay 60 mounted on the housing 34 on which jaw member 32 as shown in FIG. 3 is secured, scans and becomes activated when light from a source 61 secured on the other side of the work W is interrupted by said work. The output of sensing device 60 is passed as a signal to start-input 68 whereafter signals are sequentially generated thereby for controlling the various servos including the operation of probe motor 37 to preposition jaw member 33 adjacent the surface W2 of work W. Thereafter controller 67 controls the operation of motor $Mx$ whereby jaw member 32 is driven towards the other face W1 of the work W until switch 48 becomes activated upon contacting said surface. Upon the actuation of the switch 48, a signal is generated on the output 48a thereof which is transmitted to the stop control S of motor $Mx$ positioning member 32 against face W1 of the work. The signal generated upon closure or activation of switch 48 is also passed to the reverse drive input R of motor 37 whereafter the member 33 is driven towards face W2 of W until switch 49 closes upon contact therewith and generates a signal on its output 49a which is passed to the stop control S of motor 37 and also to an energizing input 70 of controller 69 which is thereafter operative to control the various servo motors to effect moving apart of the jaw members 32 and 33 and the withdrawal of the measuring head assembly 31 as shown in FIG. 1 from the work, if necessary, to permit removal of the work and the advancement of a new work member to the vicinity of the measuring apparatus.

An indication of the degree the jaw members 32 and 33 are separated upon predetermined positioning or contact with respective surfaces W1 and W2 of the work, is attained by means of a counter 62 counting rotations or fractions of rotations of the lead screw shaft 36' whenever a cam 36c which is secured to said shaft, actuates the actuator arm 62' of the counter. Counter 62 is provided with a trigger input 63 which is connected for receiving the signal generated by switch 49 when actuated upon movement of jaw member 33 against or adjacent surface W2. Upon receiving such energizing signal, the counter 62 is operative for generating a code signal on an output 63' thereof which is transmitted to a device 64 for recording said code and/or performing computing functions utilizing said code. The device 64, for example, may include servo and computing circuitry for operating said servo when the separation of the jaw member 32 and 33 exceeds or falls within a predetermined distance or range of distances for effecting the further handling of the work piece in a predetermined manner. Notation 71 refers to the motor driving conveyer WB which receives a signal from a delay relay, not shown, which is energized when switch 49 becomes activated. The operation of motor 71 to move work piece W away from the measuring head 31 is delayed a sufficient period of time to permit the retract controller 69 to command operation of motors $Mx$ and 37 to separate the jaw members 32 and 33 a sufficient degree so that the work is not engaged thereby and will clear the fixture upon operation of motor 71. Prepositioning of the work W relative to measuring head 31 is effected when the output of sensing device 60 is passed to the stop control S of motor 71.

Also illustrated in FIG. 7 are slow-down controls 50 and 50' for motors $My$ and 37 which controllers are illustrated in greater detail in FIG. 7'. The controller 50 is shown in FIG. 8 and controller 50' is similar in function thereto. Said controller includes a pivotally mounted actuator arm 72 having an end portion 72' projecting substantially beyond the end of the actuator of the limit switch 49 and adapted to first engage the surface of the work immediately adjacent said limit switch. The arm 72 pivots and in doing so causes an electrical wiper section 73 thereof to sweep across a surface resistance element 74 and increase the resistance of a circuit including a controller F' for the motors 37. As shown in FIG. 8 controller 50' may be a speed control such as a rheostat supplying current to the armature of a direct current motor such as motor 37, the speed of which varies proportionally to said current. Hence, the closer jaw member 33 gets to the surface W2, the slower motor 37 will operate so that said jaw member 33 will slow down substantially prior to being stopped and gently contact or be prepositioned relative to said surface W2. Notation 75 refers to the pivot which arm 72 maintains contact with to complete the circuit through said arm and including resistance element 74, power supply PS and control F' for motor 37.

Notation 50h refers to the wall of the housing or arm 50 and 50h' to the opening therein through which arm 72 projects.

FIGS. 9, 9' and 9a show details of a system for effecting dimensional measurement of an article or assembly by controlled movement of a scanning head relative to a predetermined surface of said article and the automatic detection of predetermined variations or changes in the optical characteristics of said surface for electrically indicating either distances across predetermined portions of the article such as aligned or opposite surfaces or predetermined variations in dimensions of an article from a standard for known value. A workpiece WK is shown as a sheet or slab-like structure having a plurality of stepped indentations in one edge thereof across which it may be desired to measure distances such as D1, D2, D3, etc. The measuring head assembly 80, in this instance, comprises a U-shaped mount 81 for a light source 83 and photoelectric detector or cell 84 which are mounted on opposite legs 81a and 81b of the frame 81 and positioned such that a light beam generated by the light source 83, will ordinarily pass to the photoelectric cell in detector 84 and will effect the energization of said cell so as to produce a signal at its output. If the light source is interrupted by, for example, positioning a portion of the work WK between said light source and the photoelectric cell in detector 84, the signal output of detector 84 will cease. Variations in this arrangement may also include the generation of an electrical signal on the output of detector 84 when no light appears from light source 83 which operation will depend on the phenomenon or article being measured. This may be effected by providing the proper control or switching means within the photoelectric relay housing 85 the output of which is shown connected to a computing device 86 including means for generating a signal or signals at an output 87 thereof which signals may be recorded or otherwise utilized as hereinafter described.

The control computer CO includes means in the form of recordings on a magnetic tape, for generating a plurality of command signals which are operative to preposition the measuring head assembly 80 relative to the workpiece WK and/or the workpiece relative to said measuring head assembly. The measuring head assembly 80 may comprise any suitable surface detection and transducing means including, in addition to the arrangement provided in FIG. 9, surface contacting means such as illustrated in FIGS. 3 to 6 and means of the type illustrated in FIGS. 1 and 2 for prepositioning and conveying said head assembly relative to a workpiece or assembly to be measured thereby. The U-shaped frame or mount for 81 is shown secured to an arm Ax which may comprise the terminal limb or arm of a plurality of such arms such as illustrated in FIGS. 1, 2 or 6 and including adjustably movable components for moving said scanning or surface detection means mounted thereon by the controlled operation of a plurality of servo motors referred to by the notations Mx, My, Mz, MR, MAx, etc. These motors are shown having their control inputs operatively connected to a positional control computing device 89 which is operatively connected to a plurality of reproduction heads 90 positioned for reproducing command recordings on respective channels C of a magnetic recording tape 91 for predetermining the path of movement of the measurement head assembly 80 and/or the work WK.

Signals recorded on one of the channels of a first band-like command recording area CA1 of the recording tape 91, are reproduced therefrom in synchronization with the reproduction of the command recordings which position the measurement head assembly 80 and are passed to a circuit 92 connected for conditioning the counting device in the distance computing device 86 to become active for receiving a signal generated by the photoelectric detector 85, so that, during prepositioning said head 80 before the photoelectric cell in detector 84 is aligned with a portion of the work WK and receiving light from light source 83, the counter in distance computing device 86 will not become activated. In other words, signals recorded on the command recording portion CA1 of tape 91 are utilized not only to preposition the measuring head assembly 80 and the work but also to activate and deactivate the counting or measuring circuits in device 86 so as to be active only during that portion of the measurement cycle during which scanning is effective to perform dimensional measurement. In measuring the dimension D1, for example, a signal reproduced from the tape and generated on control input 92 to 86 is generated to activate the measuring circuit or counter therein only during the interval the photoelectric relay is aligned with and scanning a path defined by limiting points illustrated at D1' and D1". The photoelectric relay in detector 84 becomes active to gate or energize the counter in housing 86 only after its scanning axis has passed the edge of the work WK inward of point D1' and generates a signal for gating said counter until said detector is conveyed past the edge inward of D1". The resulting numerical value of the counter in device 86 is automatically converted to a proportional binary or code signal generated on an output 87 connected to a recording head or bank of heads 88 which are operatively coupled to the recording member 91 for recording on a channel or channels defined by band recording area CA5 of the same tape from which the positional command recordings were reproduced. The energization or readout of the counter in computing device 86 may also be effected by reproduction of a signal from the command recording area 91 which is generated on the control line 92 and passed to 86.

By utilizing the recording and command control arrangement of FIG. 9, signals are automatically provided on the signal recording tape 91 which are indicative of the dimensions measured and are recorded in predetermined positions relative to respective positional command recordings. In other words, the positions of the newly recorded dimensional signals on the recording member are indications of which dimensions were so measured. Since the apparatus provides means for predetermining the location of dimensional indicating signals, other signals may be pre-recorded on other channels or band recording areas of the recording tape 91 such as channels CA3 and CA4 which will be indicative of standard or predetermined dimensions such as required of the measured dimension for it to conform to a predetermined value or to fall within a predetermined tolerance range. Before describing the function and operation of comparator means illustrated in FIG. 9 for comparing actual measurements with predetermined standards, reference is made to FIG. 9' which shows further details of the computing device 86. Said device may comprise a pulse counter 86c having an input 86c' which is the output of a pulse generator 86b, which is activated to generate a train of pulses of the same time duration and repetition frequency whenever an input 86b' thereof is energized by a signal from the photoelectric relay 85 provided that a normally open switch 86a in the output of 85 is closed by a signal generated on line 92' and reproduced from a channel of recording member 91 in predetermined time relation to the other positional command signals such as during the interval the scanning axis of the photoelectric cell C in housing 84 passes between points D1' and D1" along the surface of the work which includes the dimension to be measured. In other words, pulse generator 86b is activated to generate a train of pulses on its output 86c' only during that interval the actual dimension to be measured is being scanned and the number of pulses gated to the input of counter 86c is proportional to the actual dimension so measured.

After receipt of the chain of pulses generated in scanning the dimension in question, the counting device 86c may be provided with automatic means for generating a code on its output 87 which may be passed directly to the recording heads 88 and recorded on the recording area CA5. Illustrated in FIG. 9' is a control 86d which is energized by a signal on the input 92 generated in predetermined time relation to the moment of the inspection head conveying apparatus as reproduced from a channel of the command signal recording area CA2. When control input 86d is so energized, it is operative to effect the generation of said dimension indicating pulse train or binary code on the output 87 of 86c which may be directly recorded on a single channel or, as illustrated in FIG. 9', may be passed to a shift register 86e where it is converted to parallel code generated on a plurality of outputs 88' which extend to a bank 88 of recording heads for recording on respective chanels of the area CA5 of the recording member 91.

It is noted that other forms of command signal recording may also be employed to effect the program control hereinabove described and to generate said signals which are indicative of standard or desired dimensions. Reading arrangements employing recordings on punched cards, punched tape or other forms of recording may replace or supplement the described magnetic recording arrangements.

Although control of the position and path of travel of the measuring head or probe assembly 80 relative to the work WK may be effected by the continuous movement of the recording tape 91 past reproduction heads 90 for reproduction of the positional command recordings, in certain modes of automatic measurement it may be advantageous to stop the travel of the tape during periods in which the work WK is replaced by another workpiece or during periods automatic computations, recordings, or the like are being made. Accordingly, signals may be recorded on band recording area CA1 which are reproduced by a pick-up head 93' and passed to a controller 93 controlling operation of the motor MT driving the tape, to stop movement of said tape and later resume its movement past said reproduction heads. Motor MT may be automatically restarted by a time delay relay control or by a signal generated on an output such as 87 of code generator counter 86.

It is briefly noted that the counter in computing device 86 may also include means for visually indicating the value of the dimension being automatically measured for local immediate monitoring.

Referring now to recording areas designated by notations CA3, CA4 and CA5, it is noted that the reproduction heads or bank of heads referred to by the notations P3, P2 and P1 are respectively positioned for reproducing from said respective reproduction areas of said recording tape. As stated, recording area CA5 contains signals indicative of the actual dimensions measured as recorded through recording head bank 88. Prerecorded on predetermined lengths of the recording area CA4 are a plurality of signals or groups of signals which are indicative of standard or desired measurements with each group being provided in such a position that it may be reproduced simultaneously or in predetermined time relation to the reproduction of a signal or group of signals recorded on channel CA5 relating to the dimension measured by the scanning apparatus to be compared with a predetermined value. In other words, since the recordings on channel CA4 are prepositioned relative to the positional command recordings on channel or area CA1 and furthermore, since the recordings of actual scanning on CA5 are prepositioned relative to said same positional command recordings, then the standard recordings will be prepositioned relative to the actual recordings on CA5. Each associated group of recordings is reproduced and amplified in respective amplifiers 94 and 95 and passed on respective output circuits 94' and 95' to a comparator device 96 where the signals are compared and the difference or variations therein are computed. A visual or signal indication of the difference of the measured dimension from the standard dimension is provided by a second comparator 98 which is shown as having a further input 97' from a further reproduction transducing means P1 which is operatively coupled to channel CA3 on which may be recorded nominal or standard groups of signals each of which is equivalent in numerical value to an acceptable range of variations of the measured dimension from the standard dimension and is operative, upon being reproduced and transmitted on the input 97 to the comparator device 98 to determine if the measured dimension falls outside of or within the predetermined tolerance range. Accordingly, second comparator 98 is provided to accept both the difference signal generated by comparator 96 and that reproduced from channel CA3 and is adapted to generate a signal or signals at its output 99 which are indicative as to whether or not the image measured falls within or beyond the predetermined tolerance range which signals may be recorded in a further recording device 100, which may be used merely for record keeping purposes, as a means for providing dimensional codes or code indications of variations of dimensions from tolerance for immediate or later computer analysis. The device 100 may also contain an alarm means for indicating by visual means or sound to an operator when a dimension so measured falls outside of the tolerance range as determined by recordings on channels CA3 and/or CA4.

A complete description of the control apparatus for controlling the various conveyor components to travel predetermined degrees and paths to cause the measuring probe or head to be prepositioned relative to a workpiece and to thereafter move in a predetermined path in scanning or sensing various portions or surfaces of the workpiece is brief since it is not claimed specifically herein. Various automatic control systems for predetermining the path of movement of machine tools are known in the art and reference in that connection is made to patents such as 2,475,245 and 2,710,934 for details of typical systems.

FIG. 9a illustrates apparatus for controlling a single servo motor by means of signals reproduced from a magnetic recording tape 91, which apparatus when multiplied in number to provide similar controls for the various servo motors illustrated in FIG. 9, may be utilized as a suitable mode of control for the entire measuring head prepositioning apparatus.

The apparatus illustrated in FIG. 9a employs recorded digital data which is transformed to effect the control of a continuous shaft rotation by reproducing impulses with transducing means 104 from a respective channel or channels of the recording member 91 which pulses are amplified in reproduction amplifier 105 and are converted to a binary code by a diode converter 106 which code is used to set up a relay storage bank 107 containing precision resistors. The contacts of the storage unit relays set up the resistance bank in 107 so that the value set-up is proportional to the digital information recorded on the tape 91. The relay storage introduces a resistance proportional to the numerical value of the signals reproduced from the tape into a self balancing bridge which forms part of a comparator device 108. A feed-back signal generated during the operation of the servo motor 110 being controlled, such as by means of a response potentiometer 109 which is coupled to the shaft of the control motor, provides an error signal at the output of the comparator 108 which is used to control the operation of said motor until the bridge is balanced or a null condition exists whereupon the motor will stop with the component or assembly driven thereby being at a predetermined spacial position as commanded by the code on the tape. Other signals reproduced from the magnetic tape 91 are positionally provided to operate others of the motors positioning the fixture or measuring head in a predetermined sequence with each servo controlled also thereby so that said measuring head or probe will travel a predetermined path or contour relative to the workpiece.

Of course, other path predetermining means such as contour following means may also be utilized to effect such path predetermining controls.

While a photoelectric cell and light source 83 are provided in FIG. 9 for scanning and indicating the position of various edges of the workpiece to effect automatic measurement thereof, it is noted that the control apparatus as well as the recording, reproduction and comparator means of FIGS. 9, 9' and 9a may be applied for controlling and effecting automatic measurement with the probe-contact or surface sensing apparatus provided elsewhere herein such as illustrated in FIGS. 1–8. It is further noted that the train of pulses utilized for measuring the degree of movement of the probe or measurement head between or across predetermined surfaces may be effected by actuation of a limit switch by means of the rotation of the particular servo motor utilized in moving said probe or measurement head between said surfaces.

Other forms of radiation such as an X-ray or other atomic radiation source, infrared radiation generating means or the like coupled with a detector for said radiation may replace the combination of photoelectric cell and light source provided in FIG. 9 for measuring internal dimensions or the like.

FIGS. 10 to 12 illustrate details of the photoelectric detector 84 which these comprise a housing 84' in which is mounted a photoelectric cell 84c provided in its own housing and positioned adjacent a mask 84m having an opening therein of such a shape to permit passage of only a thin beam of light to the photoelectric cell. In FIG. 11 crossed slits 84a and 84b are provided in the mask 84m and permit scanning across respective horizontal or vertical edges of the workpiece and provide immediate indication when a slit is aligned with a respective edge. In FIG. 12 an L-shaped slit 84c is provided in the mask for activating the photoelectric cell immediately therebehind when light passes through either or both of the legs of the slit.

It is also noted that the opening in the mask or cover 84m may comprise a small hole such as a pin-hole rather than the illustrated slits or the optical system of the photoelectric cell 84c may be such as to provide a small area or point image of the field being scanned if the photoelectric detector within cell 84c is sensitive enough to respond to changes in light passed through said hole. Photoelectric surface scanning may also be effected without resort to direct light by scanning light reflected from or absorbed by the surface of the workpiece which will of course not be present beyond the edge of the workpiece. If a surface reflecting scanning method is employed, rather than direct light as illustrated, the sensitivity of the photoelectric relay circuit may be varied in a predetermined and programmed manner by reproducing signals from recording tape 91 to account for variations in the reflectivity of different surfaces being scanned by the means provided in my copending application Serial Number 477,467.

It is to be understood that the above-described arrangements are illustrative of the application of the principles of the invention. Numerous other arrangements may be devised by those skilled in the art without departing from the spirit and scope of the invention.

I claim:
1. An automatic inspection apparatus comprising a base member, means for prepositioning a work piece relative to said base member, electro-mechanical means moveably mounted on said base member, servo means for moving said electro-mechanical means, probe means forming part of said electro-mechanical means and positionable by the operation of said servo means relative to said work piece, automatic control means for said servo means including means for effecting the movement of said probe means along a predetermined path which path intercepts said work piece, said probe means including means for electrically detecting the surface of said work piece and means for electrically measuring the distance travelled by said probe from a first position along said path to the position where said probe detects the surface of said work piece intercepted by said path.

2. Apparatus in accordance with claim 1 and further including electrical indicating means, said indicating means including means for generating an electrical code which is indicative of the distance moved by said probe means from said first position to said surface detecting position.

3. Apparatus in accordance with claim 1, in which said electro-mechanical means including a first means for moving said probe means in a first direction and a second means for moving said probe means in a second direction, said servo means including first and second servo means operative to effect the movement of said probe means respectively in said first and second directions, controls for each of said servo means, and a programming means operatively connected to said controls, said programming means including means for generating a programmed sequence to effect the movement of said probe means in a predetermined of a plurality of paths, and means for generating a code signal indicative of the degree of motion of said probe means along a portion of said predetermined path.

4. Apparatus in accordance with claim 3 in which one limit of said portion of said path is defined by a point in space immediately adjacent a surface of said work piece and is indicative of the location of said work piece surface.

5. Apparatus in accordance with claim 4 including a comparator means operatively connected to receive said coded signal and including means for indicating when said signal varies a predetermined degree from a standard.

6. Apparatus in accordance with claim 5 including means for recording said coded signal on a recording member and comparing it with a second signal reproduced from said recording member.

7. Apparatus for measuring lineal dimensions across a work piece comprising a base member, scanning means including a fixture and a photoelectric scanning system which is sensitive to variations in light along a path scanned by said scanning means, said fixture being moveable relative to said base, means adapted for prepositioning a work piece relative to said apparatus whereby the movement of said fixture along said predetermined path will cause a portion of the surface of said work piece to be scanned by said scanning means, said scanning means being adapted to generate a first signal when the scanning path thereof intersects a first edge defining portion of said work piece, means for generating a second signal when said scanning means detects a second edge of said work piece and signal generating timing means responsive to said first and second signals for generating further signals which are indicative of the distance between said first and said second edge.

8. Apparatus in accordance with claim 7, in which said scanning means comprises a photoelectric cell and a light source disposed on said fixture a distance apart such that said work piece passes between the two during the relative movement of said fixture and said work piece, and an optical system for projecting a narrow light beam from said light source to said photoelectric cell which, when intersected by said work piece is operative to generate said first signal and when passed to said photoelectric cell after being intersected by said work piece is operative to generate said second signal.

9. An inspection apparatus for measuring distances between surfaces of a workpiece comprising a photoelectric scanner including a photoelectric sensing element, an optical system for said scanner including means for imaging part of the image field being scanned on the photoelectric sensing element thereof to the exclusion of all other image areas, a workpiece having an image outline defining opposite surfaces between which measurement is being made, a mount for said scanner, prepositioning means for said workpiece for prepositioning it relative to said scanner, means for relatively moving said scanner and said workpiece with the scanning axis of the scanner sweeping a path across the image of said workpiece defined at least in part by the two surfaces between which measurement is desired, said scanner being adjusted in sensitivity to provide signal variations in its output when it scans the images of each of said surfaces, and timing means operatively connected to said scanner and responsive to said signal variations for determining the distance between said surfaces as defined by the time between the generation of said signal variations.

10. A work gauging comparator comprising a base, a measuring head supporting column secured to said base, a pair of measuring heads secured to said column in spaced apart relation with at least one of said heads being adjustable thereon and movable towards and away from the other head, electrical surface sensing means associated with each of said heads including relay means operative when the respective surface sensing means senses a surface of a workpiece, means for selectively detecting the electric signal output of each measuring head as its sensing means senses a surface and means operative in response to said relay means for generating a further signal indicative of the distance between said heads when both said sensing means sense respective opposite surfaces of said work.

11. A work gauging comparator in accordance with claim 10, wherein said surface sensing means comprises respective limit switches secured to each of said heads having switch actuator arms projecting therefrom to first engage opposite surfaces of said workpiece when said heads are relatively moved towards each other.

12. A method for effecting automatic measurement of a predetermined dimension of a workpiece comprising the steps of first recording a plurality of positional command signals on a recording means of a positional control computer, reproducing said signals and utilizing them to control the motion of a measuring surface indicating sensor, prepositioning a workpiece relative to said sensor, causing said sensor to sense a first surface of said workpiece by movement to the proximity of said surface, indicating by means of an electrical signal when said sensor is proximate to said first surface, moving said sensor under the control of said controller along a further path adjacent said workpiece and causing said sensor to sense a second surface of said workpiece, generating a second signal upon the sensing by said sensor of said second surface of said workpiece, and determining the distance between said first and said second surfaces by using said first and second signals to respectively activate and deactivate a timing means and generating a third signal originating in said timing means which third signal is indicative of said distance.

13. A method of automatically measuring a dimension across the surface of a workpiece comprising the steps of recording on a first channel of a multi-channel recording member a plurality of positional command signals, reproducing and using said signals to control the movement of a measuring probe along a predetermined path, prepositioning a workpiece in the path of said probe, sensing the surface of said workpiece with said probe and automatically stopping the movement of said probe in the proximity of said surface, reproducing further control signals from said first channel of said recording member and utilizing said further signals to control said probe in movement along a second path adjacent said recording member, said second path being chosen to intersect a second surface of said recording member, generating signals indicative of the position of said probe when sensing said first surface and when sensing said second surface of said workpiece, and determining the spatial location of said first and second surfaces of said workpiece from said generated signals.

14. A method in accordance with claim 13 including the further step of reproducing a standard signal recorded in predetermined positional relationship to said positional command signals on said recording member and comparing said standard signal with the integrated result derived from said first and second signals.

15. A method of automatically measuring dimensions between surfaces of a workpiece comprising the steps of relatively prepositioning a workpiece and an automatic measurement device, detecting a first surface of said workpiece by means of surface positional indicating means, thereafter relatively moving said surface positional indicating means and said workpiece and automatically generating signals indicative of the degree of said movement, detecting a second surface of said workpiece with said surface position indicating means when said second surface is aligned therewith and integrating the signals generated during the movement of said workpiece and said surface detecting means between said first and second surfaces and generating a further signal indicative of the distance between said first and second surfaces.

16. A method in accordance with claim 15 including the step of recording said signal indicative of the degree of movement of said workpiece and said surface indicating means and comparing said recorded signal with a standard signal indicative of a known dimension.

17. A method in accordance with claim 16 in which the movement of said surface indicating means is controlled by signals reproduced from a recording member and said recording member is the same member in which said signals indicative of the motion of said workpiece are recorded.

18. A method in accordance with claim 17 in which said known signal is also recorded on said recording member in a predetermined position relative to said signal indicative of the movement of said surface detection means.

19. An automatic inspection apparatus for measuring a workpiece whose contour is defined by a plurality of surfaces and which has a plurality of measurable dimensions defined by the spatial relation between at least two given surfaces comprising first mount means adapted to predeterminedly position said workpiece, a base member, surface sensing means for generating first electric signals in response to its sensing one of said given surfaces, second mounting means for mounting said surface sensing means and for moving said surface sensing means relative to said base member, means for guiding said second mounting means, servo controlled means for driving said second mounting means, means responsive to the predetermined positioning of said workpiece for activating said servo controlled mounting means to drive said surface sensing means in a chosen path relative to said workpiece, means responsive to the movement of said sensing means from a first position in said path for generating second electrical signals, signal recording means, transducing means operatively associated with said signal generating means for effecting the recording of said second signals on said recording means, and means responsive to said first signals for indicating on said recording means the one of the second signals generated concurrently with the generation of the first signal.

20. An apparatus for automatically measuring the dimensions of a workpiece comprising means adapted for predeterminedly positioning said workpiece, a base, a measuring probe arm mounted on said base to be movable in any direction within a given space adjacent said base, said probe arm including means including a proximity probe having means for sensing the presence of a surface, first, second and third servo means operative to move said probe in a first, second and third directions respectively, first, second and third controls for said respective servo means, programming means operatively connected to each of said servo controls, means for generating a programmed sequence for controlling each of said servo means and for causing said probe to travel in a chosen path relative to said workpiece, signal generating means responsive to the movement of said probe for generating a plurality of code signals which are indicative of the degree of movement of said probe, differentiating means operatively connected to said signal generating means and responsive to the signals generated thereby and connected to said probe to receive signals indicative of the positioning of said probe adjacent different surfaces of said workpiece in said path and means responsive to said signal generating means signals and to said positioning indicative signals to indicate the degree of movement of said probe, said differentiating means including a recording member adapted to record the signals indicative of the degrees of motion of said probe between different portions of the surface of said workpiece.

References Cited by the Examiner
UNITED STATES PATENTS

| | | | |
|---|---|---|---|
| 717,716 | 1/1903 | Robbins | 33—170 |
| 1,988,255 | 1/1935 | Soons | 88—14 |
| 2,454,763 | 11/1948 | Bishop | 33—143 |
| 2,508,370 | 5/1950 | Bozoian. | |
| 2,537,770 | 1/1951 | Livingston et al. | 77—1 X |
| 2,579,569 | 12/1951 | Hauck et al. | 33—14 |
| 2,752,687 | 7/1956 | Graham | 33—147 |
| 2,810,316 | 10/1957 | Snyder | 88—14 |
| 2,820,187 | 1/1958 | Parsons et al. | 318—162 X |
| 2,844,879 | 7/1958 | Roeger | 33—174 |
| 3,069,608 | 12/1962 | Forrester et al. | 318—162 |

ISAAC LISANN, *Primary Examiner.*

ROBERT B. HULL, *Examiner.*

H. N. HAROIAN, *Assistant Examiner.*